US008779700B1

(12) United States Patent
Prodic et al.

(10) Patent No.: US 8,779,700 B1
(45) Date of Patent: Jul. 15, 2014

(54) ASSISTING CONVERTER

(71) Applicants: Aleksandar Prodic, Toronto (CA); Mahmoud Shousha, Toronto (CA); Victor Marten, Flushing, NY (US); Ioannis Milios, New York, NY (US)

(72) Inventors: Aleksandar Prodic, Toronto (CA); Mahmoud Shousha, Toronto (CA); Victor Marten, Flushing, NY (US); Ioannis Milios, New York, NY (US)

(73) Assignee: Sendyne Corporation, New York, NY (US)

( * ) Notice: Subject to any disclaimer, the term of this patent is extended or adjusted under 35 U.S.C. 154(b) by 0 days.

(21) Appl. No.: 14/003,536

(22) PCT Filed: Aug. 27, 2013

(86) PCT No.: PCT/US2013/056917
§ 371 (c)(1),
(2), (4) Date: Mar. 5, 2014

(87) PCT Pub. No.: WO2014/036042
PCT Pub. Date: Mar. 6, 2014

Related U.S. Application Data

(60) Provisional application No. 61/693,644, filed on Aug. 27, 2012, provisional application No. 61/867,956, filed on Aug. 20, 2013.

(51) Int. Cl.
*H02P 1/00* (2006.01)
(52) U.S. Cl.
USPC .......................................... 318/139; 318/812
(58) Field of Classification Search
USPC .................... 318/139, 800, 812, 813
See application file for complete search history.

(56) References Cited

U.S. PATENT DOCUMENTS

| | | | | |
|---|---|---|---|---|
| 5,659,465 A | * | 8/1997 | Flack et al. | 363/71 |
| 6,169,678 B1 | * | 1/2001 | Kondo et al. | 363/71 |
| 7,282,814 B2 | * | 10/2007 | Jacobs | 307/82 |
| 7,612,283 B2 | * | 11/2009 | Toyomura et al. | 136/244 |
| 7,936,150 B2 | | 5/2011 | Milios | |
| 8,269,455 B2 | | 9/2012 | Marten | |
| 2012/0086390 A1 | | 4/2012 | Lim et al. | |
| 2012/0249052 A1 | | 10/2012 | Milios | |
| 2012/0256593 A1 | | 10/2012 | Milios | |

FOREIGN PATENT DOCUMENTS

| | | |
|---|---|---|
| JP | 2008-504798 A | 2/2008 |
| JP | 2011-155718 A | 8/2011 |
| KR | 10-0815431 B1 | 3/2008 |
| WO | 2008/097031 A1 | 8/2008 |
| WO | 2012/172468 A2 | 12/2012 |

OTHER PUBLICATIONS

International Search Report for International application No. PCT/US2013/056917 mailed Dec. 30, 2013, (3 pages).
Written Opinion of the International Searching Authority for International application No. PCT/US2013/056917 mailed Dec. 30, 2013, (6 pages).

\* cited by examiner

*Primary Examiner* — Rina Duda
(74) *Attorney, Agent, or Firm* — Oppendahl Patent Law Firm LLC

(57) ABSTRACT

What is described is a battery management architecture that eliminates previously described problems of the previous solutions and compensates for the extra cost of a cell-balancing circuit. These advantages are achieved by integrating the voltage step-up and balancing functions as well as charging functions inside a single converter topology. Instead of providing the entire output voltage and power, the converter in this configuration is merely assisting the battery by providing a portion of the power delivered to the load, rather than the entirety of the power delivered to the load. This portion of power is proportional to the difference between the output and the battery pack voltages.

28 Claims, 7 Drawing Sheets

FIG. 5
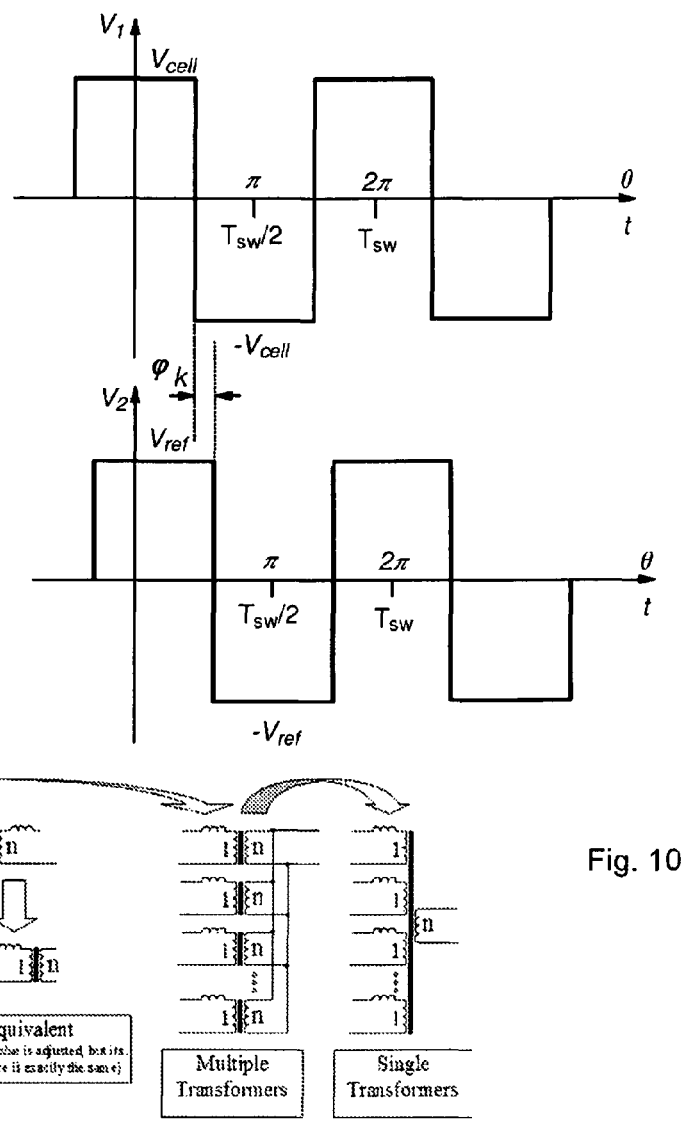
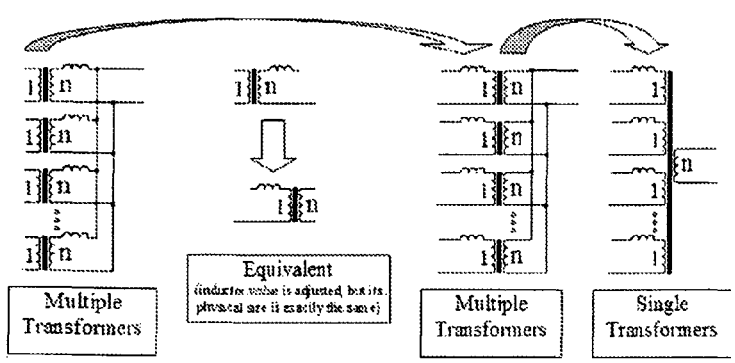
Fig. 10

ASSISTING CONVERTER

BACKGROUND

A typical power management system of an electric or hybrid vehicle is shown in FIG. 1. It consists of a battery pack 101 (usually comprised of large number of Lithium-Ion or Lithium-Polymer cells), a step-up stage (usually boost-based converter) 103, and a motor drive 104 providing power for an electric motor 102. In many vehicle designs there is regenerative braking which permits recharging of the battery pack 101, the details of which are omitted for clarity in FIG. 1.

In some cases, the power management system also includes a cell balancing circuit 105, which compensates for different states of charges (SOC) of individual cells, as shown in FIG. 1. The SOC variations usually occur due to the aging and variations in the manufacturing process. Through cell balancing the effective capacity of the battery pack can be significantly increased.

The balancing circuits can be divided into two general categories. The first one is the passive balancing systems, in which the cells are balanced by dissipating energy from excessively charged cells, through resistors.

The second category is the active balancing systems, which are far more efficient. In these systems, the energy of overcharged cells is transferred to those with less charge using dc-dc converters. Even though the benefits of the active cell balancing are known, their use is relatively sparse, due to the overly large extra cost and weight the cell balancing circuits add to the system.

Balancing systems of possible interest include those described in the following US patent published applications:
US 2012-0256593 A1
US 2012-0249052 A1
and in the following granted US patents:
U.S. Pat. No. 7,936,150
U.S. Pat. No. 8,269,455
and in the following published international patent application:
WO/2012/172468
all of which are owned by the same assignee as the assignee of the present patent application.

A prior-art balancing circuit 105 might utilize a buck-boost and a Cuk converter for cell balancing. These topologies can be implemented with a relatively small number of active components and regulated with fairly simple controllers. However, these circuits are fairly large in form factor, which reflects on the overall physical size of the system. Implementations based on the use of a bi-directional flyback and a two stage flyback converters have been proposed. Compared to other solutions, these systems lower efficiency at high power levels.

Others have proposed a configurable system for cell balancing using a large number of switches to transfer the energy between cells. The main drawback of such a system is that the balancing becomes too slow for the energy transfer between cells having similar output voltages.

Many prior-art approaches direct themselves only to a single one of the functions suggested by the functional blocks of FIG. 1. This prompts the alert reader to recall the functional block 103. The step-up converter 103 of FIG. 1 steps up the voltage from the battery 101 to the extent that is required to provide a desired DC voltage to the load 104. It will be appreciated that the step-up converter 103 as shown in FIG. 1 is required to be able to accommodate the entirety of the power transferred to the load 104. This means that the converter 103 must use switches (typically semiconductor switches) and reactive components (for example capacitors and inductors) that allow the converter to pass the full load power, rated for full load currents and rated for the full reverse voltages that might arise in serving the full load voltage. In some cases the current and voltage for which the switches must be rated is larger than the current and voltage at the output, for example in a flyback circuit. The switches in a boost converter also conduct larger than the load current.

It would be desirable if a way could be found to accomplish the aims of the functional blocks of FIG. 1 in a more integrated way, using fewer components than in prior-art approaches, and using components that would not require the full-voltage ratings of the semiconductor switches in some prior-art approaches. The cost of a semiconductor switch often increases at least linearly with the voltage rating of the switch and may increase faster than linearly. Thus there are rewards for the designer who devises topologies and approaches that permit use of components with smaller voltage ratings as compared with those needed in prior-art topologies and approaches.

SUMMARY OF THE INVENTION

What is described is a battery management architecture that eliminates previously described problems of the previous solutions and compensates for the extra cost of a cell-balancing circuit. These advantages are achieved by integrating the voltage step-up and balancing functions as well as charging functions inside a single converter topology. Instead of providing the entire output voltage and power, the converter in this configuration is merely assisting the battery by providing a portion of the power delivered to the load, rather than the entirety of the power delivered to the load. This portion of power is proportional to the difference between the output and the battery pack voltages.

DESCRIPTION OF THE DRAWING

The invention will be described with respect to a drawing in several figures.

FIG. 5 shows control waveforms.

FIG. 10 shows various inductor topologies that may be employed.

Where possible, like reference numerals have been employed for like elements.

DETAILED DESCRIPTION

Figure 2:
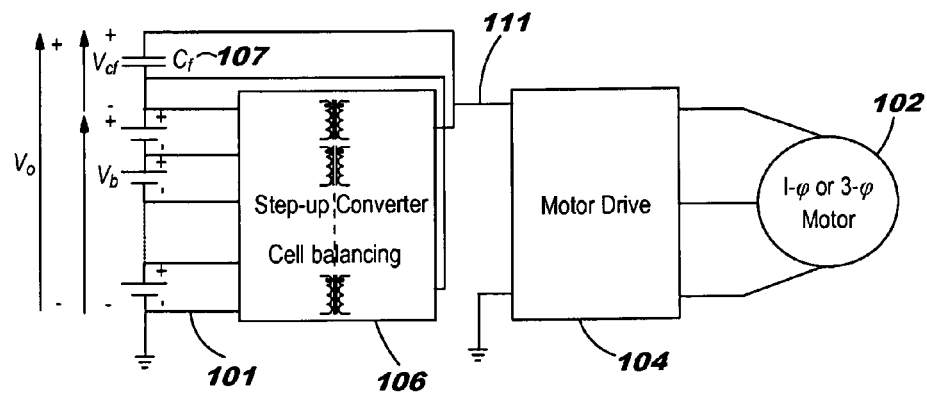
FIG. 2 shows in functional block diagram form the topology according to an embodiment of the invention.

The introduced topology, here referred to as an "assisting converter" architecture, is shown in FIG. 2. The converter 106 operates at such that the stepped-up output voltage at 111 is formed as a sum of the battery pack voltage $V_{batt}$ (across battery 101) and the output voltage of a bidirectional multi-input single output converter stage, $V_f$, (across capacitor $C_f$)

where the inputs of the converter 106 are connected to the battery cells of the battery 101.

As described below, the assisting configuration drastically reduces power processing requirements needed to achieve required conversion and, consequently, improves power processing efficiency. The introduced topology also allows fast cell balancing even when the cells have similar or equal voltages and allows energy transfer between any two cells in the battery pack. Furthermore, unlike other solutions, the topology provides functionality of the system even when a significant number of cells in the battery pack are out of function, potentially improving overall system reliability.

Figure 1:
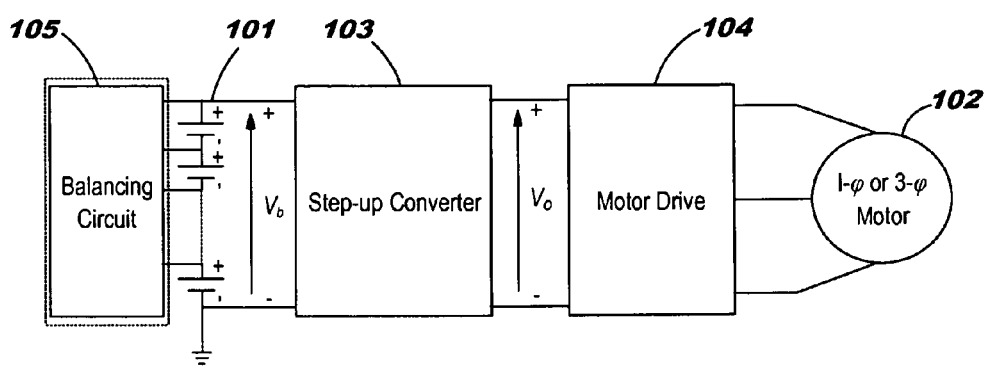
FIG. 1 shows a prior-part approach to cell balancing and providing converted power to a load.

The principle of operation of a general assisting converter 106 shown in FIG. 2 can be described through a comparison with the conventional system of FIG. 1. For the assisting converter 106 the power delivered to an output load 104 that takes current $I_{out}$ is:

$$P_{out}=V_{out}I_{out}=(V_{batt}+V_{cf})I_{out}=P_{converter}+P_{batt\_direct},$$

where $P_{converter}=V_{cf}I_{out}$ is the portion of the battery power delivered through the converter and $P_{batt\_direct}=V_{batt}I_{out}$ is the remaining portion, directly delivered by the battery without any processing.

For the conventional converter 103 (FIG. 1), $P_{converter}=P_{out}$ and $P_{batt\_direct}$ is 0, since the step-up converter processes all of the power delivered to the load. This means that, in comparison with the conventional system of FIG. 1, the converter 106 in the assisting configuration of FIG. 2 is required to process $V_{cf}/V_{out}$ times lower power and, thus, can be implemented with smaller components.

The reduction in processing power also makes design of a highly efficient assisting converter 106 simpler. For the assisting system of FIG. 2 the overall power processing efficiency can be defined as:

$$\eta = \left(\frac{P_{batt\_direct}}{P_{out}}\cdot 100\% + \frac{P_{conv}}{P_{out}}\eta_{conv}\right) = \left(\frac{V_{batt}}{V_{out}}\cdot 100\% + \frac{V_{conv}}{V_{out}}\cdot \eta_{converter}\right),$$

where $\eta_{converter}$ is the efficiency of the assisting converter 106. This expression can be explained by looking at the system of FIG. 2 and noticing that the power processing losses occur only for the portion of power that is not directly provided by the battery 101. As described early, this portion of power is proportional to the ratio of the output and converter-provided voltages.

For example, if the assisting converter 106 is providing a 20% of the output voltage and has a very low power processing efficiency of 50%, a relatively high power processing efficiency of 90% at the system level still can be achieved. The system may be designed so that the capacitor 107 carries only 20% of the voltage intended to be delivered to the load, or only 10%, or only 5%.

This shows that, in order to achieve targeted overall system efficiency, the assisting converter 106 (FIG. 2) can be designed with much less stringent power processing requirements than the conventional converter 103 (FIG. 1), further reducing the overall system cost and complexity.

It will be helpful to characterize some of the benefits of the inventive topology of FIG. 2 by way of a generalization of the disclosed topology. A series of cells (in battery 101) is seen. Each cell has a bidirectional converter associated with it (part of block 106). The bidirectional converter relating to a particular cell is able to draw from capacitor 107 to charge up the particular cell. The bidirectional converter relating to a particular cell is able to draw from the particular cell to charge up capacitor 107. This provides three distinct functions:

if a charging current is supplied to the system, the system is able to receive that current and is able to pass along the charging current to the various cells each according to its own needs (so that the charging process leads to a near-balance in the state of charge of the cells);

when power is being supplied to the load, the system is able to draw upon the various cells as needed to charge up the capacitor 107 so as to lead to a nearly constant voltage being supplied to the load at 111;

in any regime (discharging, charging, or quiescence) a balancing of cells (in terms of state of charge) may be accomplished.

Yet another benefit presents itself, namely that even if a particular cell fails "open" the system will be able to maintain a substantial portion of its function despite loss of that cell. Indeed the system will be able to continue its function even with loss of two or more cells in an "open" failure mode.

Finally the alert reader will appreciate that the topology of FIG. 2 may be generalized to the case of a single cell or a battery of cells that is employed as a simple two-terminal device. The cell (or two-terminal battery) may be placed in series with a capacitor 107 with the assisting converter 106 connected to both. In such a situation, many of the benefits of the topology are preserved such as the reduced need for high voltage ratings in the capacitor and in the semiconductors of the converter, as well as the need to worry only about the conversion efficiency of the portion of the power associated with the voltage on the capacitor 107. (More will be said about this below.)

Battery Cell Balancing.

It will be recalled from FIG. 1 that often a balancing function (block 105) is provided. In the system of FIG. 2, to provide battery cell balancing, the input currents of the bi-directional multi-input converter 106 can be regulated. The regulation can be performed such that the currents provided by (drawn from) the individual cells are proportional to their states of charge. The alert reader will appreciate that it is possible to achieve an energy transfer from cells with a higher state of charge to other cells having less charge, through what may be termed an "indirect" energy transfer. In this process, cells with high SOC transfer energy to the capacitor, while the cells with low SOC take energy from it. Both of these cases are demonstrated as follows.

Figure 3:
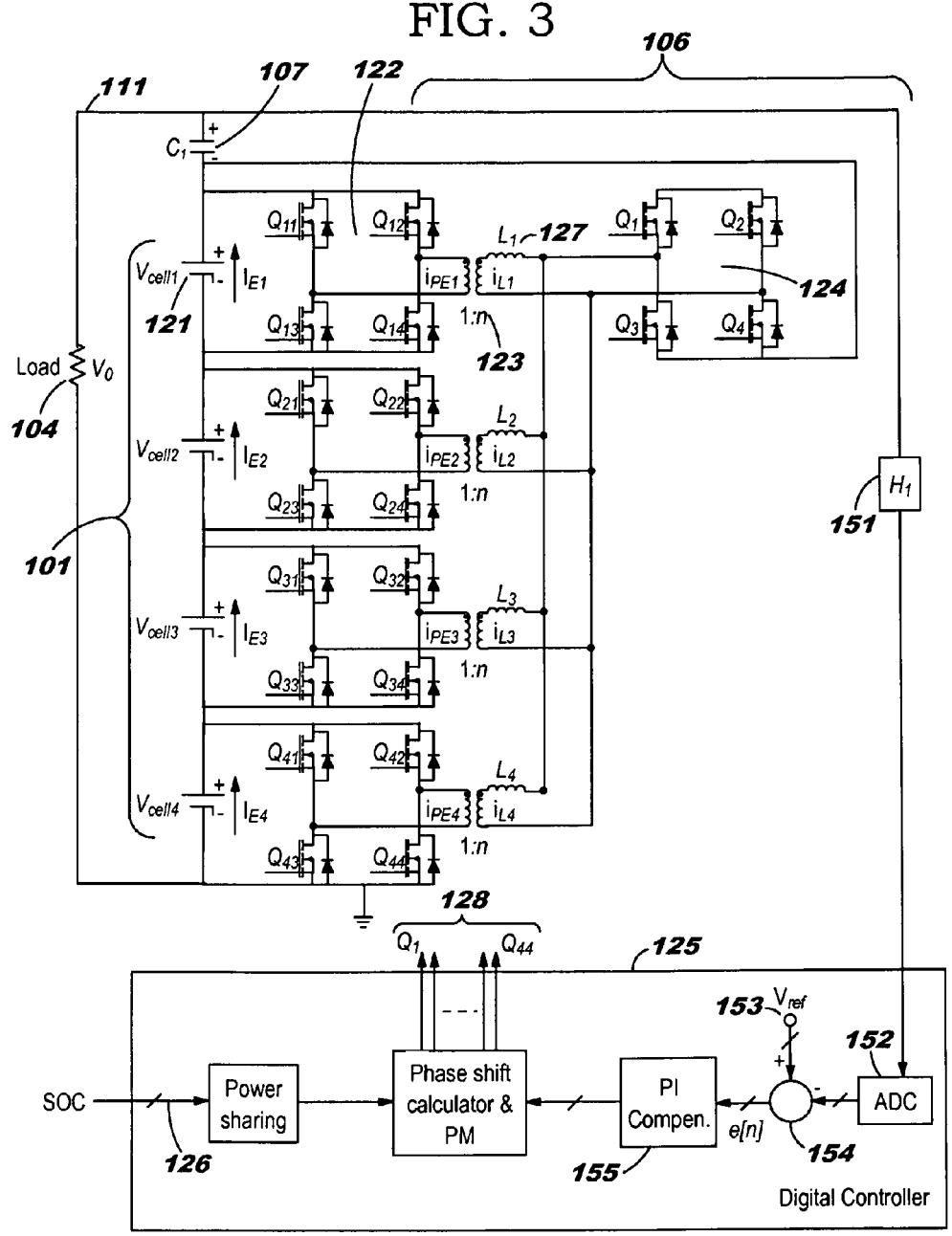
FIG. 3 shows the system of FIG. 2 in greater detail.

An implementation of the assisting converter 106 based on a multi-phase isolated dual active bridge converter is shown in FIG. 3. In addition to providing galvanic isolation and bi-directional energy flow, the dual active bridge (DAB) has a number of other features that make it very attractive for the targeted applications. Those include high power processing efficiency (achieved through inherent zero voltage or current switching) and much smaller inductor volume comparing to the conventional hard switching and resonant topologies. The small inductance value opens a possibility for elimination of a discrete inductor through the utilization of the transformer leakage inductance.

Another interesting feature of the DAB is that it can operate with both continuous input and continues output currents, thus reducing requirements for input and output filters.

The system of FIG. 3 consists of a number of transformers (e.g. 123) whose primary windings are connected to the individual battery cells (e.g. 121) and the secondary windings linked to the output capacitor 107, through small inductors 127.

The linkage between the transformer 123 and its respective cell 121 is by means of an active bridge 122. The active bridge 122 has four semiconductor switches, typically FETs (field-effect transistors).

The linkage between the transformer 123 and the capacitor 107 is also by means of an active bridge 124. The active bridge 124 also has four semiconductor switches, typically FETs (field-effect transistors).

It is these semiconductor switches that are driven by control signals 128 from the controller 125. The control signals have phase relationships which bring about for example a draw of current from one or another of the cells, or a pumping of current into one or another of the cells, and which bring about a charging-up of capacitor 107 or a drawing-down of capacitor 107.

An implementation based on a multi-winding transformer is also possible. This is shown in FIG. 10.

The digital controller 125 implementing phase-shift modulation regulates the operation of this converter 106. The phase shift control provides both the output voltage regulation (charging of capacitor 107 to tend toward a constant voltage available to load 104) and cell balancing (balancing the energy content of the various cells) through the regulation of the currents to and from the individual cells.

Figure 4:
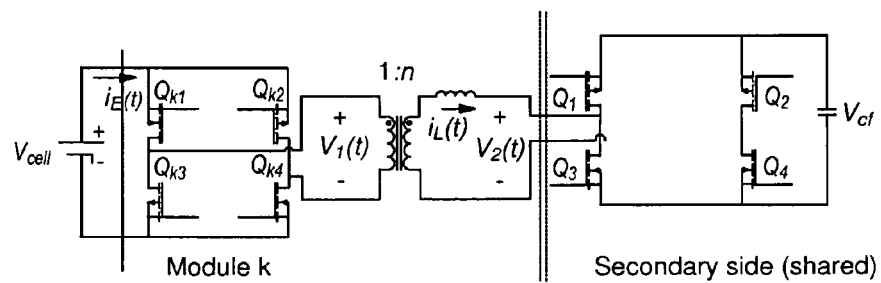
FIG. 4 shows a single cell channel of the system in FIG. 3 in greater detail.

Typical waveforms of a DAB converter connected between two DC sources are shown in FIG. 5. The power transfer between the sources (each of the cells and the output port of the converter in this case) can be derived from the well-known power transfer formula for sinusoidal systems:

$$P_k = \frac{nV_A V_B \sin(\varphi_k)}{\omega L},$$

where $V_A$ and $V_B$ are the amplitudes of the two sinusoidal sources, $\varphi_k$ is the phase shift (delay) between the voltages, and $\omega L$ the impedance value of an inductor placed between them. In the case of FIG. 5, the waveforms are not sinusoidal but are square waves, and so the power transfer equation becomes:

$$P_k = n\frac{V_{cell} V_{cf} \varphi_k (\pi - |\varphi_k|)}{\pi \omega L},$$

where $V_{cell}$ is the voltage of the battery cell (e.g. 121 in FIG. 3), n the turns ratio of the transformer, $V_{cf}$ is the voltage of the floating capacitor 107 (FIGS. 2, 3, and 4), $\omega = 2\pi f_{sw}$ where $f_{sw}$ is the switching frequency of the converter, and $\varphi_k$ is the phase shift (delay) between the voltages $v_1(t)$ and $v_2(t)$, shown in FIGS. 4 and 5.

Figure 6:
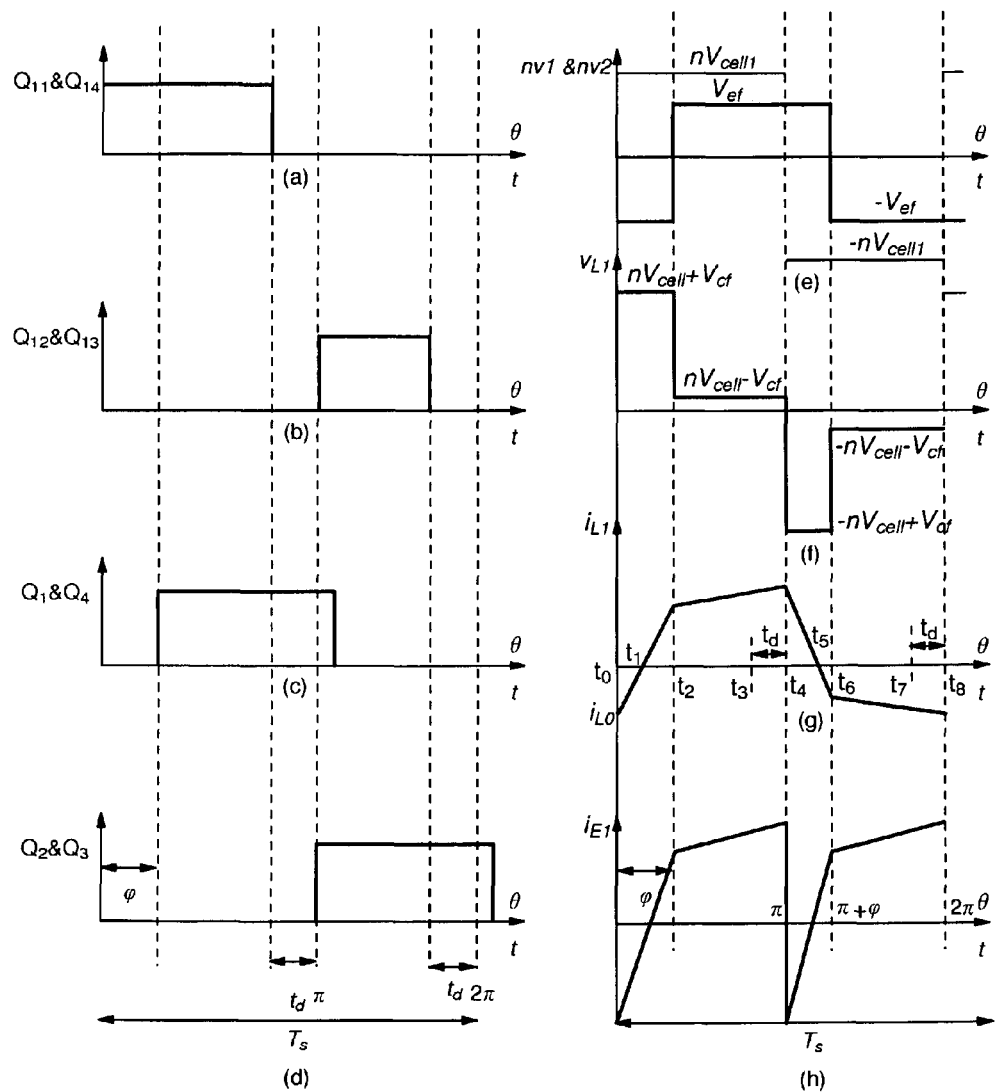
FIG. 6 shows signal levels for various stages during a cycle of operation in an embodiment of the invention.

FIG. 6 shows realistic key waveforms of the DAB from FIG. 4. The diagrams show the state of the switching components that include non-overlapping transistor times $t_d$, switch nodes voltages ($nv_1(t)$, i.e. $v_1(t)$ reflected on the secondary transformer side, and $v_2(t)$), and the inductor voltage and current waveforms, $v_L(t)$ and $i_L(t)$, respectively. The diagrams also show the current supplied by the battery cell $i_E(t)$. FIGS. 6(a) to (d) shows transistor on-off states. FIG. 6(e) shows switch node voltages. FIG. 6(f) shows voltage across the inductor. FIG. 6(g) shows inductor current. FIG. 6(h) shows battery cell current.

The non-overlapping times prevent simultaneous conduction of both switches of a single converter branch, that is, they prevent a short circuit.

Figure 7:
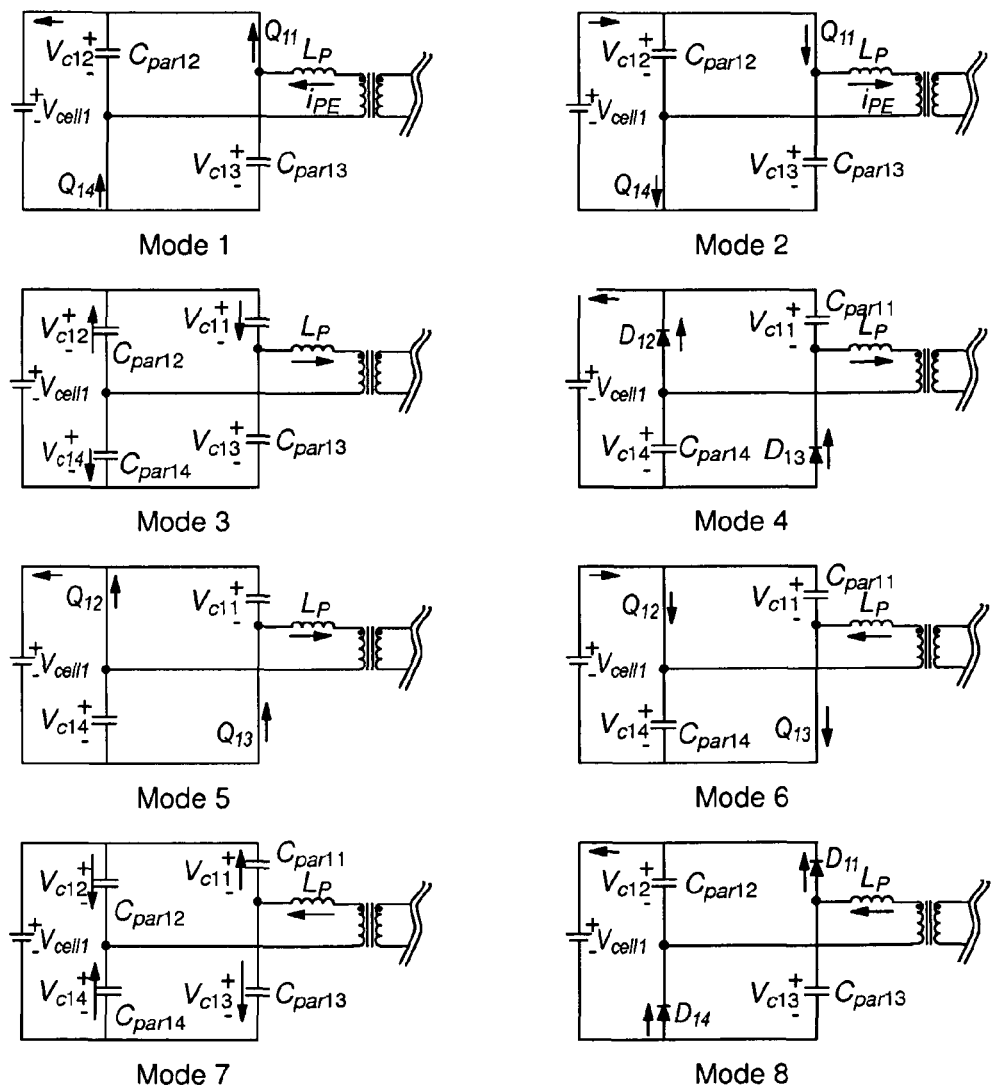
FIG. 7 shows equivalent circuits for a single cell channel, for various modes of operation.

Eight equivalent circuits of FIG. 7, representing different modes that the left side of the DAB goes through over a switching period $T_s$, can be observed. In these equivalent circuits of FIG. 7, non-conducting MOSFETs are replaced with their parasitic drain-source capacitances, labeled as $C_{par}$. Likewise the conducting MOSFETs are replaced with short circuits or diodes, depending on the state of the gate drive signal. The equivalent circuits also include the leakage inductance of the primary side of the transformer $L_p$.

Mode 1 corresponds to the time interval $t_0$ to $t_1$ of FIG. 6(g), during which Q11 and Q14 are turned on while Q12 and Q13 are switched off, during which and the primary side current $i_{PE}(t)$ is negative, that is, is leaving the "dot" on the inductor.

Mode 2 occurs during the time interval $t_1 < t \leq t_2$. This mode starts when $i_{PE}(t)$, that is $i_L(t)$, changes polarity and has the same state of switches as Mode 1.

Mode 3 occurs during the transistors' non-overlapping time (between $t_3$ and $t_4$) when all of the switches are turned off. It can be seen that in this mode a resonant circuit consisting of the $L_p$ and the capacitive network $C_{par}11$ to $C_{par}14$ is formed, meaning that oscillations might occur, depending on the speed of the body diodes of the MOSFETs. Ideally, for the case when the antiparallel body diodes are fast, a soft transition between Mode 3 and Mode 4 occurs. This happens when the $C_{par}13$ is discharged to a value of approximately $-V_F$ and the charge of $C_{par}11$ is approximately equal to $V_{cell}+V_F$, where $V_F$ is the forward voltage drop of the body diodes, shown in the equivalent circuit of Mode 4.

In Mode 4, the anti-parallel diodes conduct and the maximum voltage across the transistors is clamped to a value of $V_{cell}+2_{VF}$.

For the case when the body diodes of the MOSFETs are slow, compared to the period of the resonant circuit oscillations, and, hence, are not able to react, the circuit does not go through Mode 4. The amplitude of the overshoot is directly proportional to the energy stored in the leakage inductance at the time instant $t_3$, i.e. $W_E = \frac{1}{2} i_L(t_3)^2 L_p$, and inversely proportional to the equivalent of the $C_{par}11$-$C_{par}14$ capacitive network.

Mode 3 (or Mode 4) is followed by Mode 5. Mode 5 starts immediately after Q12 and Q13 are turned on and occurs during the time interval $t_4 < t \leq t_5$. This mode is equivalent to Mode 1. If prior to this mode the DAB was in Mode 4, both transistors turn on softly, with zero voltage transition. For a slow body diode case, i.e. when the previous state is Mode 3, a soft transition cannot be guaranteed and, consequently, increased switching losses occur.

A similar analysis can be carried out for Modes 6 to 8.

The discussion just given shows that the parasitic drain source capacitance increases the voltage stress across the switches and negatively affects the converter efficiency for the case when the antiparallel diode is slow compared to the frequency of oscillations. The discussion also indicates that the voltage stress value and the frequency of oscillations are inversely proportional to the equivalent capacitance of the $C_{par}11$-$C_{par}14$ network.

To minimize this effect a straightforward solution would be to use faster Schottky diodes connected in parallel with the body diodes of the transistors. These diodes would provide snubber action. They would allow the converter 106 to enter Mode 4, described in the previous discussion, and consequently would eliminate voltage overshoots while providing zero voltage switching (ZVS).

To minimize the cost, in this case, instead of using extra Schottky diodes, a small ceramic capacitor is placed in parallel with each of the transistors. These capacitors, labeled as $C_s$ in FIG. 8, reduce the frequency of the resonant circuit oscillation during the non-overlapping times. This allows the body diodes to clamp the voltage.

The waveform of FIG. 6(g) shows that the current provided by the battery has large variations. These variations could reduce the battery life time and, due to a large rms current value, have a negative effect on the converter efficiency.

Figure 8:
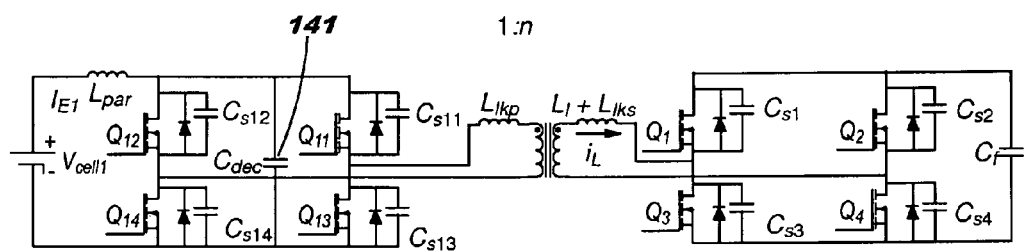
FIG. 8 shows the system of FIG. 4 with snubbers.

To eliminate this effect a decoupling capacitor $C_{dec}$ 141 is placed across the primary side bridge, as shown in FIG. 8. Together with the parasitic inductance of the connecting wires this capacitor 141 forms a second-order filter which drastically reduces the input, current ripple.

In addition to eliminating the large ripple, $C_{dec}$ 141 can also be potentially used for improving the reliability of the system in the case of a battery cell failure. In such a situation the capacitor can act as a replacement for the battery, capable of maintaining the cell voltage and transferring reactive power. Controller.

Figure 9:
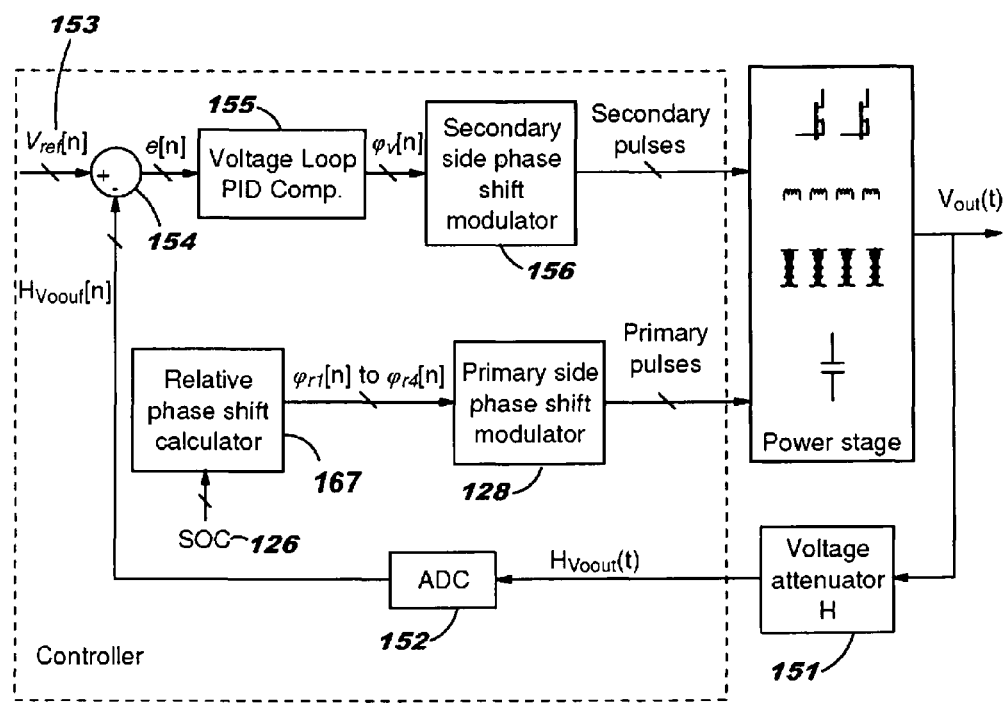
FIG. 9 shows the controller 106 in greater detail.

The main goal of the controller 125 of FIG. 3 is to maintain the output voltage (at 111) at the desired value while providing cell balancing. It is shown in more detail in FIG. 9. The control is performed through phase shift modulation, where the angle on the secondary side is used for the output voltage and the settings of the angles on the primary side (relative phase shifts) is used for cell balancing. In this case, the voltage loop is implemented in a digital fashion. The voltage at 111 is attenuated (attenuator 151) yielding an output voltage $HV_{out}(t)$ which is converted into its digital equivalent with an analog-to-digital converter (ADC) 152 yielding signal $H_{vout}[n]$. This value is than compared (at comparator 154) to the desired reference $V_{ref}[n]$ (reference 153) and the resulting error e[n] is passed to a Voltage loop PID compensator 155. The compensator 155 calculates a value jv[n], which is the input for the secondary side phase shift modulator 156 (controlling the secondary-side bridge 124). Based on this input the secondary side phase shift modulator 156 adjusts the phase shift between the secondary side switches (bridge 124) and one of the set of primary side switches, i.e. a reference set, such that the desired output voltage is obtained at 111.

The relative phase shifts between the DAB switches on the primary sides (for example bridge 122) are adjusted based on the cells' state of charge (SOC) (input 126). The calculation of the relative phase shifts between primary side modules is performed by the Primary side phase shift calculator (167), which sends four control signals, jr1[n] to jr4[n], to the Primary side phase shift modulator 128, for each of the bridges such as 122.

What was just described is passing the analog voltage to an ADC and then carrying out a digital difference calculation and carrying out later steps digitally. The alert reader will appreciate that there are many ways to provide a controller that will offer the benefits of the invention. The controller 125 may be implemented by appropriate firmware in a microcontroller of suitable bandwidth. Alternatively it may be implemented by an FPGA with suitable programming. Another approach could be the use of hardware combining mixed-signal circuits, for example analog-to-digital converters for measurement, and digital logic for calculations. An implementation based on the use of application specific integrated circuits (ASIC) is also possible.

A simplified balancing method may be employed instead of using continuously variable phase shifts for the balancing functions. In this implementation, one of n pre-defined discrete values of the relative phase shifts is assigned to each cell, depending on its state of the charge. This way computational overhead is minimized.

EXAMPLE

To verify the previously described concepts, a 4-cell, 200 W experimental setup was built and tested. At the input, four 6V, 12 AH Lead-Acid cells were used. The DAB stages operated at a switching frequency of 100 kHz and provided a 42 V regulated output. The component values for the power stage of FIG. 8 are shown in this table:

| Component | Value |
|---|---|
| Power Transfer Inductance ($L_t$) | 10 µH |
| Primary Leakage Inductance ($L_{1kp}$) | 0.5 µH (measured and calculated) |
| Secondary Leakage inductance ($L_{1ks}$) | 0.5 µH (measured and calculated) |
| Filter Capacitance ($C_{dec}$) | 4.4 mF |
| Transformer Turns Ratio (1:n) | 1:4 |
| Input Parasitic Inductance ($L_{par}$) | 300 nH (measured) |
| Drain to Source Capacitance LV side ($C_{par11}$) | 0.75 nF (estimated)+ |
| Drain to Source Capacitance HV side ($C_{par1}$) | 0.45 nF (estimated)+ |
| Snubber Capacitance | 47 nF |

The controller of this setup was implemented with an FPGA system. For test purposes the system was largely over-designed allowing an opportunity to verify operation of the assisting converter at higher power levels. The tests were performed for cell balancing as well as for developing the voltage assist of the capacitor 107. Operation of this converter as a battery charger was also tested. The converter achieved a peak efficiency of 92%.

The discussion above focuses on a system which is connected with a battery composed of electrochemical cells. Such a system might, however, also offer some of its benefits to a solar panel array of photovoltaic modules.

The alert reader will likewise appreciate that while the system is described as connected with a battery of many cells, the system can likewise offer its benefits in the case of a single cell. In such a case it provides a more efficient DC-to-DC converter because less than all of the power is being passed through the converter.

It is interesting to consider the ability of this system to tolerate any of several possible failure modes. As mentioned above, if a single cell were to fail "open", a suitably sized capacitor 141 may permit continued system function by stepping into the shoes of the failed cell.

In many prior-art systems, a capacitor is placed in parallel with the load, at the output of a step-up (boost) stage (for example within block 103 in FIG. 1) of a system. In FIG. 1 if a capacitor is employed in the converter 103 at its output, the capacitor will need to be rated for the full output voltage. In contrast, the capacitor 17 need only be rated for the voltages that it will encounter, which may be only a fraction of the load voltage. As the price of a capacitor is often proportional to the square of the voltage rating, the capacitor in block 103 of FIG. 1 will cost much more than the capacitor 107 in FIG. 2. This permits the disclosed system to be less expensive compared with some prior-art systems.

In sum, a new system level architecture for providing both battery balancing and step-up voltage functions has been described. The architecture is based on an "assisting converter" concept where a low-power converter is used merely to provide a voltage that is added to the battery pack voltage to yield the desired output. The assisting converter can also provide cell balancing. In comparison with conventional systems this architecture drastically reduces the power processing requirements of the step-up power stage and it relaxes the requirements regarding converter power processing efficiency. An implementation of this concept based on multi-input isolated dual active bridge topology (DAB) has been demonstrated. In comparison with a single step-up stage the multi-input DAB allows operation at a higher switching fre-

The invention claimed is:

1. A system for use with a voltage source and a load and a capacitor, the voltage source defining first and second nodes, the capacitor connected to the second node and thereby defining a third node, the load connected with the first node and the third node, the voltage source comprising a plurality of series-connected energy sources;
   a module connected with the energy sources of the voltage source, the module connected with the capacitor at the second node and the third node;
   the module comprising an inductor;
   the module further comprising a plurality of first bidirectional circuits, each first bidirectional circuit connected with a respective energy source of the voltage source and connected with the inductor;
   the module further comprising a second bidirectional circuit, the second bidirectional circuit connected with the capacitor and connected with the inductor;
   the module further comprising a controller connected with the first bidirectional circuits and with the second bidirectional circuit and disposed to control the bidirectional circuits to pass energy therebetween.

2. The system of claim 1 wherein each bidirectional circuit is an active-bridge forward converter comprising four semiconductor switches in a bridge.

3. The system of claim 2 wherein the controller is responsive to measured information about the energy sources of the voltage source, for generating control signals to the semiconductor switches of the active-bridge forward converters of the plurality of first bidirectional circuits and for generating control signals to the semiconductor switches of the active-bridge forward converter of the second bidirectional circuit.

4. The system of claim 1 wherein each of the energy sources comprises an electrochemical cell.

5. The system of claim 1 wherein each of the energy sources comprises a photovoltaic module.

6. The system of claim 1 further comprising a respective capacitor in parallel with each of the energy sources.

7. The system of claim 4 wherein the load comprises a motor of a vehicle.

8. The system of claim 1 wherein the plurality of energy sources have different energy content, and wherein the controller draws current from a first of said plurality of energy sources and passes the current to a second of said plurality of energy sources.

9. The system of claim 8 wherein the drawing of current from the first of said plurality of energy sources and the passing of current to the second of said plurality of energy sources tends to balance the energy content thereof.

10. The system of claim 1 wherein the controller draws current from a first of said plurality of energy sources and passes current to the capacitor.

11. The system of claim 10 wherein the drawing of current from the first of said plurality of energy sources and the passing of current to the capacitor tends to keep the voltage between the first and third nodes nearly constant.

12. The system of claim 1 wherein one of several predefined discrete values of relative phase shifts is assigned to each energy source, depending on its state of charge.

13. A method for use with a voltage source and a load and a capacitor, the voltage source defining first and second nodes, the capacitor connected to the second node and thereby defining a third node, the load connected with the first node and the third node, the voltage source comprising a plurality of series-connected energy sources, the method comprising:
   drawing a first level of current from at least a first one of the plurality of series-connected energy sources;
   drawing a second level of current from at least a second one of the plurality of series-connected energy sources, the first level of current being non-identical to the second level of current;
   passing the current from the at least a first one of the plurality of series-connected energy sources through a respective bidirectional circuit, the respective bidirectional circuit having an output;
   passing the current from the at least a second one of the plurality of series-connected energy sources through a respective bidirectional circuit, the respective bidirectional circuit having an output;
   passing the outputs of the bidirectional circuit respective to the at least a first one of the plurality of series-connected energy sources and of the bidirectional circuit respective to the at least a second one of the plurality of series-connected energy sources through a second bidirectional circuit to the capacitor.

14. The method of claim 13 wherein the passing of currents tends to keep the voltage between the first and third nodes nearly constant.

15. The method of claim 13 further comprising the step, carried out with respect to a third one of plurality of series-connected energy sources having a smaller energy content than the energy content of the first one of the plurality of series-connected energy sources, of passing the outputs of the respective first bidirectional circuits of the first and second ones of the plurality of series-connected energy sources to the third one of the plurality of series-connected energy sources through a first bidirectional circuit respective thereto.

16. The method of claim 15 wherein the drawing of current from the first at least one energy source and the passing of current to the third at least one energy source tends to balance the energy content thereof.

17. A system for use with a voltage source and a load and a capacitor, the voltage source defining first and second nodes, the capacitor connected to the second node and thereby defining a third node, the load connected with the first node and the third node;
   a module connected with the voltage source, the module connected with the capacitor at the second node and the third node;
   the module comprising an inductor;
   the module further comprising a first bidirectional circuit, the first bidirectional circuit connected with the voltage source and connected with the inductor;
   the module further comprising a second bidirectional circuit, the second bidirectional circuit connected with the capacitor and connected with the inductor;
   the module further comprising a controller connected with the first bidirectional circuit and with the second bidirectional circuit and disposed to control the bidirectional circuits to pass energy therebetween.

18. The system of claim 17 wherein each bidirectional circuit is an active-bridge forward converter comprising four semiconductor switches in a bridge.

19. The system of claim 18 wherein the controller is responsive to measured information about the voltage source, for generating control signals to the semiconductor switches of the active-bridge forward converter of the first bidirectional circuit and for generating control signals to the semiconductor switches of the active-bridge forward converter of the second bidirectional circuit.

20. The system of claim 17 wherein the voltage source comprises a battery comprising electrochemical cells.

21. The system of claim 17 wherein the voltage source comprises a photovoltaic array.

22. The system of claim 20 wherein the load comprises a motor of a vehicle.

23. The system of claim 17 wherein the controller draws current from the voltage source and passes current to the capacitor.

24. The system of claim 23 wherein the drawing of current from the voltage source and the passing of current to the capacitor tends to keep the voltage between the first and third nodes nearly constant.

25. The system of claim 17 wherein one of several predefined discrete values of relative phase shifts is assigned to each energy source, depending on its state of charge.

26. A method for use with a voltage source and a load and a capacitor, the voltage source defining first and second nodes, the capacitor connected to the second node and thereby defining a third node, the load connected with the first node and the third node, the method comprising:
    drawing a first level of current from the voltage source;
    passing the current from the voltage source through a first bidirectional circuit, the first bidirectional circuit having an output;
    passing the output of the first bidirectional circuit through a second bidirectional circuit to the capacitor;
    wherein the passing of currents tends to keep the voltage between the first and third nodes nearly constant.

27. A method for use with a voltage source and a current source and a capacitor, the voltage source defining first and second nodes, the capacitor connected to the second node and thereby defining a third node, the load connected with the first node and the third node, the voltage source comprising a plurality of series-connected energy sources, each of the series-connected energy sources associated with a respective first bidirectional circuit, the method comprising:
    receiving a charging current from the current source, thereby tending to charge the capacitor;
    drawing current from the capacitor through a second bidirectional circuit to an inductor;
    passing a first level of current from the inductor to the first bidirectional circuit respective to a first one of the plurality of series-connected energy sources;
    passing a second level of current from the inductor to the first bidirectional circuit respective to a second one of the plurality of series-connected energy sources, the first level of current being non-identical to the second level of current.

28. The method of claim 27 wherein the passing of current to the first at least one of the plurality of series-connected energy sources and the passing of current to the second at least one of the plurality of series-connected energy sources tends to balance the energy content thereof.

* * * * *

UNITED STATES PATENT AND TRADEMARK OFFICE
CERTIFICATE OF CORRECTION

| | | |
|---|---|---|
| PATENT NO. | : 8,779,700 B1 | Page 1 of 1 |
| APPLICATION NO. | : 14/003536 | |
| DATED | : July 15, 2014 | |
| INVENTOR(S) | : Aleksandar Prodic et al. | |

It is certified that error appears in the above-identified patent and that said Letters Patent is hereby corrected as shown below:

Title Page, please delete:
"(74) Attorney, Agent or Firm- Oppendahl Patent Law Firm LLC"

And insert the following correction:
-- (74) Attorney, Agent, or Firm- Oppedahl Patent Law Firm LLC --

Signed and Sealed this
Thirteenth Day of January, 2015

Michelle K. Lee
*Deputy Director of the United States Patent and Trademark Office*